(12) United States Patent
Tani et al.

(10) Patent No.: US 8,160,377 B2
(45) Date of Patent: Apr. 17, 2012

(54) IMAGE COMPRESSION APPARATUS

(75) Inventors: Yujiro Tani, Osaka (JP); Yusuke Mizuno, Osaka (JP); Hideki Daian, Osaka (JP); Nobuhiro Minami, Osaka (JP); Masahiro Moriyama, Osaka (JP); Hiromu Hasegawa, Osaka (JP)

(73) Assignee: MegaChips Corporation, Osaka-shi (JP)

( * ) Notice: Subject to any disclaimer, the term of this patent is extended or adjusted under 35 U.S.C. 154(b) by 588 days.

(21) Appl. No.: 12/408,924

(22) Filed: Mar. 23, 2009

(65) Prior Publication Data

US 2010/0128999 A1 May 27, 2010

(30) Foreign Application Priority Data

Nov. 25, 2008 (JP) .................................. 2008-299318

(51) Int. Cl.
*G06K 9/00* (2006.01)

(52) U.S. Cl. ....................................... 382/251; 382/232

(58) Field of Classification Search .................. 382/232, 382/166, 233, 251; 342/367; 381/2; 341/67; 375/130, 147, 335, 299, 347, 141, 144, 295, 375/E1.033

See application file for complete search history.

(56) References Cited

U.S. PATENT DOCUMENTS

| 7,430,257 B1 * | 9/2008 | Shattil ............................ 375/347 |
| 7,593,449 B2 * | 9/2009 | Shattil ............................ 375/130 |
| 7,965,761 B2 * | 6/2011 | Shattil ............................ 375/147 |

OTHER PUBLICATIONS

"HD Photo-Photographic Still Image File Format", Bitstream Specification, Microsoft Corporation, Version 1.0 URL: http://www.microsoft.com/whdc/xps/hdphotodpk.mspx, Nov. 7, 2006, 73 pages.
"Coding of Still Pictures", International Organization for Standardisation and International Electrotechnical Commision, URL: http://www.itscj.ipsj.or.jp/sc29/open/29view/29n9026t.doc, Dec. 19, 2007, 151 pages.
U.S. Appl. No. 12/408,901, filed Mar. 23, 2009, Moriyama, et al.

* cited by examiner

*Primary Examiner* — Anh Hong Do
(74) *Attorney, Agent, or Firm* — Oblon, Spivak, McClelland, Maier & Neustadt, L.L.P.

(57) ABSTRACT

A symbol generation part serially inputs a data string of quantization data. If quantization data of non-zero coefficient is inputted, respective information on an absolute value, a zero run and a sign of the non-zero coefficient are stored in registers. When quantization data of the next non-zero coefficient is inputted, the respective information on the absolute value, the zero run and the sign stored in the registers are updated. At that time, the contents of the registers which have been stored immediately before the input are outputted as symbol data of the immediately preceding non-zero coefficient.

5 Claims, 10 Drawing Sheets

| DA01 | | | | DA02 | | | | DA03 | | | | DA04 | | | |
|---|---|---|---|---|---|---|---|---|---|---|---|---|---|---|---|
| | HP01 | | | | HP02 | | | | HP03 | | | | HP04 | | |
| DA05 | | | | DA06 | | | | DA07 | | | | DA08 | | | |
| | HP05 | | | | HP06 | | | | HP07 | | | | HP08 | | |
| DA09 | | | | DA10 | | | | DA11 | | | | DA12 | | | |
| | HP09 | | | | HP10 | | | | HP11 | | | | HP12 | | |
| DA13 | | | | DA14 | | | | DA15 | | | | DA16 | | | |
| | HP13 | | | | HP14 | | | | HP15 | | | | HP16 | | |

| DA01 | DA02 | DA03 | DA04 |
|---|---|---|---|
| DA05 | DA06 | DA07 | DA08 |
| DA09 | DA10 | DA11 | DA12 |
| DA13 | DA14 | DA15 | DA16 |

EXTRACT DA01 TO DA16

| DB | | | |
|---|---|---|---|
| | | LP | |
| | | | |
| | | | |

AFTER SECOND PCT CONVERSION

FIG. 5

| SYMBOL NAME | DESCRIPTIONS | | | |
|---|---|---|---|---|
| ABS | ABSOLUTE VALUE OF NON-ZERO COEFFICIENT − "1" | | | |
| INDEX | A SET OF INFORMATION ON WHETHER THERE IS A NON-ZERO COEFFICIENT OR NOT, WHETHER THERE IS A ZERO RUN OR NOT AND EOB IN LP AND HP. FIRST OUTPUTTED INDEX IS FIRST_INDEX AND OTHERS ARE NEXT_INDEX. | | | |
| | FIRST_INDEX | [0] | WHETHER 0-RUN IS PRESENT OR NOT BEFORE FIRST NON-ZERO COEFFICIENT<br>0: 0-RUN PRESENT<br>1: 0-RUN NOT PRESENT | |
| | | [1] | WHETHER ABSOLUTE VALUE OF CORRESPONDING NON-ZERO COEFFICIENT IS "1" OR NOT<br>0: ABSOLUTE VALUE IS "1"<br>1: ABSOLUTE VALUE IS NOT "1" | |
| | | [3:2] | INFORMATION ON DATA FOLLOWING CORRESPONDING NON-ZERO COEFFICIENT<br>0B00: ALL ZERO (EOB)<br>0B01: NON-ZERO COEFFICIENT IS PRESENT IMMEDIATELY AFTER (NO 0-RUN IS PRESENT IMMEDIATELY AFTER)<br>0B10: ZERO IS PRESENT IMMEDIATELY AFTER (0-RUN IS PRESENT IMMEDIATELY AFTER)<br>0B11: RESERVED. | |
| | NEXT_INDEX | [0] | WHETHER ABSOLUTE VALUE OF CORRESPONDNG NON-ZERO COEFFICIENT IS "1" OR NOT<br>0: ABSOLUTE VALUE IS "1"<br>1: ABSOLUTE VALUE IS NOT "1" | |
| | | [2:1] | INFORMATION ON DATA FOLLOWING CORRESPONDING NON-ZERO COEFFICIENT<br>0B00: ALL ZERO (EOB)<br>0B01: NON-ZERO COEFFICIENT IS PRESENT IMMEDIATELY AFTER (NO 0-RUN IS PRESENT IMMEDIATELY AFTER)<br>0B10: ZERO IS PRESENT IMMEDIATELY AFTER (0-RUN IS PRESENT IMMEDIATELY AFTER)<br>0B11: RESERVED. | |
| SIGN | INFORMATION OF SIGN  0: PLUS  1: MINUS | | | |
| ZERO_RUN | RUN LENGTH OF ZERO BETWEEN NON-ZERO COEFFICIENTS (OR POSITIONED FIRST) | | | |
| FLEXBIT | FLEXBIT. BIT LENGTH IS DETERMINED BY MODEL BIT | | | |

FIG. 7

| BLOCK NO. | 40 | | | | ... | 41 | | | | | | | | | | | | | | | ... |
|---|---|---|---|---|---|---|---|---|---|---|---|---|---|---|---|---|---|---|---|---|---|
| POS | 0 | 1 | 2 | 3 | ... | 0 | 1 | 2 | 3 | 4 | 5 | 6 | 7 | 8 | 9 | 10 | 11 | 12 | 13 | 14 | ... |
| DATA | 0 | 0 | 3 | 0 | ... | 0 | 0 | 3 | 0 | 0 | 3 | 10 | 0 | 0 | 0 | -1 | 0 | 2 | 0 | 0 | ... |
| ABS | - | - | 3 | - | ... | - | - | 3 | - | - | 2 | 2 | - | - | - | 9 | - | 0 | - | - | ... |
| INDEX | - | - | 001 | - | ... | - | - | 001 | - | - | 1010 | 011 | - | - | - | 101 | - | 100 | - | - | ... |
| ZERO_RUN | - | - | 2 | - | ... | - | - | 2 | - | - | 2 | 2 | - | - | - | 0 | - | 3 | - | - | ... |
| SIGN | - | - | 0 | - | ... | - | - | 0 | - | - | 0 | 0 | - | - | - | 0 | - | 1 | - | - | ... |

FIG. 8

| BLOCK NO. | 52 | | | | | | | 53 | | | 54 | | | | | |
|---|---|---|---|---|---|---|---|---|---|---|---|---|---|---|---|---|
| POS | ⋯ | 9 | 10 | 11 | 12 | 13 | 14 | 0 | 0 | 0 | 0 | 1 | 2 | 3 | 4 | ⋯ |
| DATA | ⋯ | 0 | 1 | 0 | 0 | 0 | 0 | -3 | 15 | 40 | 0 | 2 | 0 | 1 | 3 | ⋯ |
| ABS | ⋯ | - | 2 | - | - | - | - | 0 | 3 | 15 | 40 | 0 | - | 1 | - | ⋯ |
| INDEX | ⋯ | - | 101 | - | - | - | - | 000 | - | - | - | - | - | 1010 | 010 | ⋯ |
| ZERO_RUN | ⋯ | - | 2 | - | - | - | - | 2 | - | - | - | - | - | 1 | 1 | ⋯ |
| SIGN | ⋯ | - | 0 | - | - | - | - | 0 | 1 | 0 | 0 | 0 | - | 0 | 0 | ⋯ |

| BLOCK NO. | 40 | | | | | | | | | | | | | | | 41 | |
|---|---|---|---|---|---|---|---|---|---|---|---|---|---|---|---|---|---|
| POS | ... | 0 | 1 | 2 | 3 | 4 | 5 | 6 | 7 | 8 | 9 | 10 | 11 | 12 | 13 | 14 | 0 | ... |
| DATA | ... | 0 | 0 | 3 | 0 | 0 | 3 | 10 | 0 | 0 | 0 | -1 | 0 | 2 | 0 | 0 | 0 | ... |
| ABS | ... | - | - | 2 | - | - | 2 | 9 | - | - | - | 0 | - | 1 | - | - | - | ... |
| INDEX | ... | - | - | 1010 | - | - | 011 | 101 | - | - | - | 100 | - | 001 | - | - | - | 1010 | ... |
| ZERO_RUN | ... | - | - | 2 | - | - | 2 | 0 | - | - | - | 3 | - | 1 | - | - | - | 1 | ... |
| SIGN | ... | - | - | 0 | - | - | 0 | 0 | - | - | - | 1 | - | 1 | - | - | - | 0 | ... |

IMAGE COMPRESSION APPARATUS

BACKGROUND OF THE INVENTION

1. Field of the Invention

The present invention relates to an image compression apparatus for compressing still image data.

2. Description of the Background Art

As formats for compressing still image data, conventionally, the JPEG (Joint Photographic Experts Group) format has been widely used. Further, the HD Photo format which allows prevention of degradation of images and ensures high compression ratio, as compared with the JPEG format, has been developed. The HD Photo format is discussed in detail in Non-Patent Documents, such as "HD Photo-Photographic Still Image File Format" (Nov. 7, 2006, Microsoft Corporation, URL: http://www.microsoft.com/whdc/xps/hdphotodp-k.mspx) and "Coding of Still Pictures" (Dec. 19, 2007, International Organisation for Standardisation and International Electorotechnical Commission, URL: http://www.itscj.ipsj.or.jp/sc29/open/29view/29n9026t.doc.)

An image compression apparatus based on the HD Photo format (hereinafter, referred to simply as an "image compression apparatus") performs frequency conversion of still image data on a macroblock-by-macroblock basis, to generate DC (direct current) component data and two types of AC (alternating current) component data. One of the two types of AC component data is low-pass component data called "Low Pass" and the other one is high-pass component data called "High Pass". The image compression apparatus performs quantization and predictive coding of these component data. Then, quantization data of each component is entropy coded and outputted as a stream.

FIG. 9 is a block diagram showing an image compression apparatus 100 in the background art. The image compression apparatus 100 is an apparatus for converting still image data into compressed image data in the HD Photo format. The image compression apparatus 100 comprises a first frequency converter 101, a second frequency converter 102, a quantization part 103, a predictive processing part 104, a symbol generation part 105 and an entropy coding part 106.

The first frequency converter 101 performs frequency conversion of the first hierarchy on still image data inputted to the image compression apparatus 100, to output DC component data of the first hierarchy and AC component data of the first hierarchy.

The second frequency converter 102 further performs frequency conversion on the DC component data of the first hierarchy outputted from the first frequency converter 101, to output DC component data of the second hierarchy and AC component data of the second hierarchy.

Hereinafter, the AC component data of the first hierarchy is referred to as "high-pass component data". The DC component data of the second hierarchy is referred to simply as "DC component data" and the AC component data of the second hierarchy is referred to as "low-pass component data".

The low-pass component data and the high-pass component data each have fifteen pieces of conversion factor data. Specifically, the low-pass component data has a block consisting of fifteen pieces of conversion factor data for each of three channels of YUV. The high-pass component data has sixteen blocks each consisting of fifteen pieces of conversion factor data and each of the sixteen blocks has conversion factor data for each of three channels of YUV. On the other hand, the DC component data has one piece of conversion factor data for each of three channels of YUV.

The quantization part 103 performs quantization on the DC component data, the low-pass component data and the high-pass component data, and the predictive processing part 104 performs predictive coding on quantization data. The symbol generation part 105 generates a symbol string from a bit string of predictive coded quantization data, and the entropy coding part 106 performs entropy coding on the symbolized quantization data, to generate the compressed image data.

As shown in FIG. 9, a first buffer 111 and a second buffer 112 are connected to the symbol generation part 105. The symbol generation part 105 stores the quantization data of one block outputted from the predictive processing part 104 into the first buffer 111, and at the same timing, it takes the quantization data of one block out from the second buffer 112 to output symbol data. Further, the symbol generation part 105 stores the quantization data of one block outputted from the predictive processing part 104 into the second buffer 112, and at the same timing, it takes the quantization data of one block from the first buffer 111 to output symbol data. Thus, by switching the input and output of the two buffers, it is intended to increase the speed of the processing.

FIG. 10 is a view showing a data format of quantization data stored in the first buffer 111 and the second buffer 112. Herein, discussion will be made on an exemplary case, as shown in FIG. 10, where a data string of one block, consisting of fifteen pieces of quantization data {0, 0, 3, 0, 0, 3, 10, 0, 0, 0, −1, 0, 2, 0, 0}, is stored in the first buffer 111.

First, since the first and second quantization data are zero coefficients, no quantization data is stored in the first buffer 111. Since the third quantization data is "3" which is a non-zero coefficient, information of an absolute value (ABS)="3", a zero run (ZERO_RUN)="2" and a sign (SIGN)="0" is stored in the first buffer 111. The zero run refers to the number of sequential zero coefficients present before the non-zero coefficient in the block. As to the sign, "0" indicates positive and "1" indicates negative. Further, the symbol generation part 105 has a register for counting the number of sequential zeros.

Subsequently, since the fourth and fifth quantization data are zero coefficients, no quantization data is stored in the first buffer 111. Since the sixth quantization data is "3" which is a non-zero coefficient, {ABS, ZERO_RUN, SIGN}={3, 2, 0} is stored in the first buffer 111. Further, since the seventh quantization data is "10" which is a non-zero coefficient, {ABS, ZERO_RUN, SIGN}={10, 0, 0} is stored in the first buffer 111.

Subsequently, since the eighth, ninth and tenth quantization data are zero coefficients, no quantization data is stored in the first buffer 111. With respect to the eleventh quantization data, {ABS, ZERO_RUN, SIGN}={1, 3, 1} is stored in the first buffer 111, and with respect to the thirteenth quantization data, {2, 1, 0} is stored in the first buffer 111. Then, with respect to the last quantization data, exceptionally, {0, 2, 0} is stored in the first buffer 111.

Thus, the data string of quantization data of one block, being symbolized, is stored in the first buffer 111. Then, at the timing where the quantization data of the next block is stored in the second buffer 112, the quantization data stored in the first buffer 111 is outputted as the symbol data. At that time, an index is also generated and outputted as part of the symbol data.

FIG. 11 is a view showing contents of the symbol data. FIG. 11 shows the symbol data formed of the data string of quantization data shown in FIG. 10. In FIG. 11, contents of the quantization data inputted to the symbol generation part 105 are shown in the rows above the double line and contents of the symbol data outputted from the symbol generation part 105 are shown in the rows below the double line. In the symbol data, values of ABS, ZERO_RUN and SIGN are the same as those stored in the first buffer 111. As to the values of "ABS", however, values obtained by subtracting "1" from the values stored in the first buffer 111 are outputted as the symbol data in accordance with the specification of the HD Photo format.

As to INDEX in the symbol data, detailed discussion will be made in the preferred embodiment of the present invention but will be omitted herein. The INDEX includes information indicating a relation between the absolute value of the non-zero coefficient and "1" and information on the quantization data following the non-zero coefficient.

Thus, the symbol data is not outputted at the timing where a zero coefficient presents itself but is outputted intermittently at the timing where a non-zero coefficient presents itself. Since there are fifteen pieces of quantization data in one block, fifteen data output timings are needed in order to output the symbol data from the first buffer 111 or the second buffer 112. On the other hand, fifteen data input timings are needed in order to store the quantization data into the first buffer 111 or the second buffer 112. Thus, the timing of inputting the quantization data into one of the two buffers and the timing of outputting the symbol data from the other buffer are synchronized, and this makes it possible to efficiently generate the symbols at high speed.

There are some cases, however, where the timings become out of sync. As discussed above, the high-pass component data and the low-pass component data are each a set of blocks each consisting of fifteen pieces of quantization data and the DC component data consists of only three pieces of quantization data for YUV.

At to the timing of switching from the high-pass component data to the DC component data, it takes a time period for three pieces of data to input the DC component data to the first buffer 111 while it takes a time period for fifteen pieces of data to output the symbol data from the second buffer 112. For this reason, there occurs an idle time in the timing of inputting data to the first buffer 111.

At to the timing of switching from the DC component data to the low-pass component data, it takes a time period for three pieces of data to output the symbol data from the first buffer 111 while it takes a time period for fifteen pieces of data to input the low-pass component data to the second buffer 112. For this reason, there occurs an idle time in the timing of outputting the symbol data.

Thus, though it is intended to increase the speed by using two buffers, the input/output idle time for twelve pieces of data occurs two times for each macroblock, and it is desired to further increase the processing time.

Further, each of the first and second buffers 111 and 112 needs a data size for the bit length of the quantization data×15 for ABS, a data size for the 4 bits×15 for ZERO_RUN and a data size for 1 bit×15 for SIGN. Therefore, if the bit length of the quantization data is 32 bits, the two buffers needs (32+4+1)×15×2 bits in total. Considering that downsizing and power saving are strongly required of electronic equipments incorporating the HD Photo, it is desired to reduce the buffer size to a minimum.

SUMMARY OF THE INVENTION

The present invention is intended for an image compression apparatus. According to an aspect of the present invention, the image compression apparatus comprises a frequency converter for performing frequency conversion on image data to generate frequency conversion data, a quantization part for performing quantization on the frequency conversion data to generate quantization data, a symbol generation part for symbolizing the quantization data to generate symbol data; and a coding part for coding the symbol data to generate coded data, and in the image compression apparatus of the present invention, the symbol generation part has a quantization data input part for serially inputting a data string of quantization data consisting of a plurality of blocks, a quantization data information memory part capable of storing an absolute value, a sign and zero run information of one piece of quantization data of non-zero coefficient, and a symbol data output part for outputting an absolute value, a sign and zero run information of quantization data of the immediately preceding non-zero coefficient stored in the quantization data information memory part as the symbol data if the object quantization data which is inputted to the quantization data input part is a non-zero coefficient.

By the present invention, it becomes unnecessary to once store the quantization data of all non-zero coefficients in a block into a buffer, and this makes it possible to reduce the size of storage capacity needed for processings.

According to another aspect of the present invention, the frequency converter has a first frequency converter for performing frequency conversion on inputted image data, to output a first DC component and a first AC component, and a second frequency converter for inputting the first DC component and performing frequency conversion on the first DC component, to output a second DC component and a second AC component, the data string of quantization data is a data string in which a block corresponding to the second DC component, a plurality of blocks corresponding to the second AC component and a plurality of blocks corresponding the first AC component each constitute one macroblock in this order and macroblocks formed in this order present themselves repeatedly, and symbol data corresponding to quantization data of the last non-zero coefficient in each block is outputted when quantization data of the first non-zero coefficient in the next block presents itself.

Even at the timing of switching among the second DC component, the second AC component and the first AC component, there occurs no useless idle time in the processing time, and this increases the processing speed.

Further, it is possible to make the process common to the second DC component, the second AC component and the first AC component.

Therefore, it is an object of the present invention to increase the speed of symbol generation in the HD Photo format and reduce the size of storage capacity used for the symbol generation.

These and other objects, features, aspects and advantages of the present invention will become more apparent from the following detailed description of the present invention when taken in conjunction with the accompanying drawings.

BRIEF DESCRIPTION OF THE DRAWINGS

FIG. 5 is a view showing a data structure of symbol data;

FIG. 7 is a view showing an output timing of the symbol data and contents of the data;

FIG. 8 is a view showing contents of the symbol data outputted at the timing of switching blocks;

FIG. 11 is a view showing an output timing of the symbol data and contents of the data in the background-art image compression apparatus.

DESCRIPTION OF THE PREFERRED EMBODIMENTS

<1. Constitution of Image Compression Apparatus and Operation Flow of HD Photo Processing>

Figure 1:
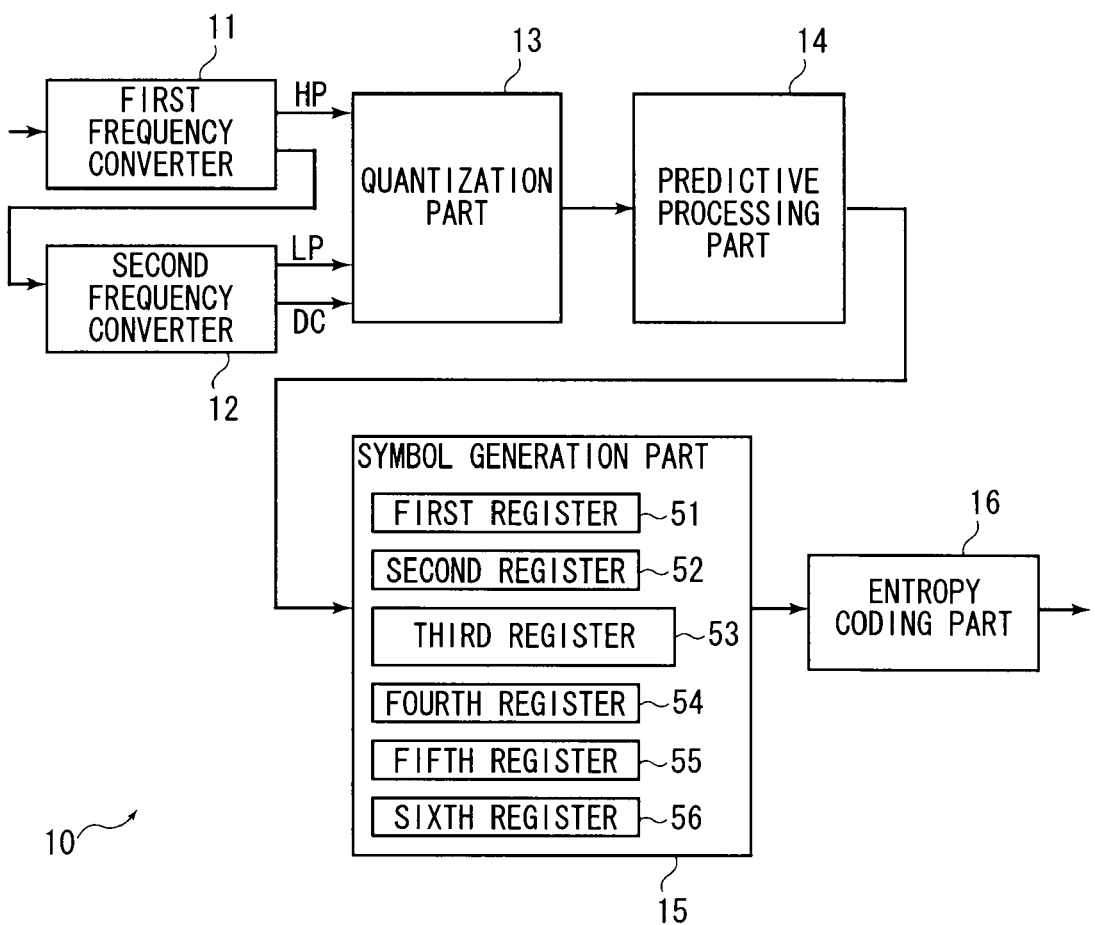
FIG. 1 is a block diagram showing an image compression apparatus in accordance with a preferred embodiment of the present invention.

Hereinafter, the preferred embodiment of the present invention will be discussed, referring to figures. FIG. 1 is a block diagram showing a constitution of an image compression apparatus 10 in accordance with the preferred embodiment of the present invention. The image compression apparatus 10 of FIG. 1 is an apparatus for converting still image data into compressed image data in the HD Photo format.

The image compression apparatus 10 comprises a first frequency converter 11, a second frequency converter 12, a quantization part 13, a predictive processing part 14, a symbol generation part 15 and an entropy coding part 16.

The still image data inputted to the image compression apparatus 10 is subjected to color conversion, filtering and the like in a not-shown preprocessing part. For example, the still image data in the RGB format is converted into data in the YUV444 format by color conversion. Then, the still image data after being subjected to filtering is inputted to the first frequency converter 11.

Figure 2:
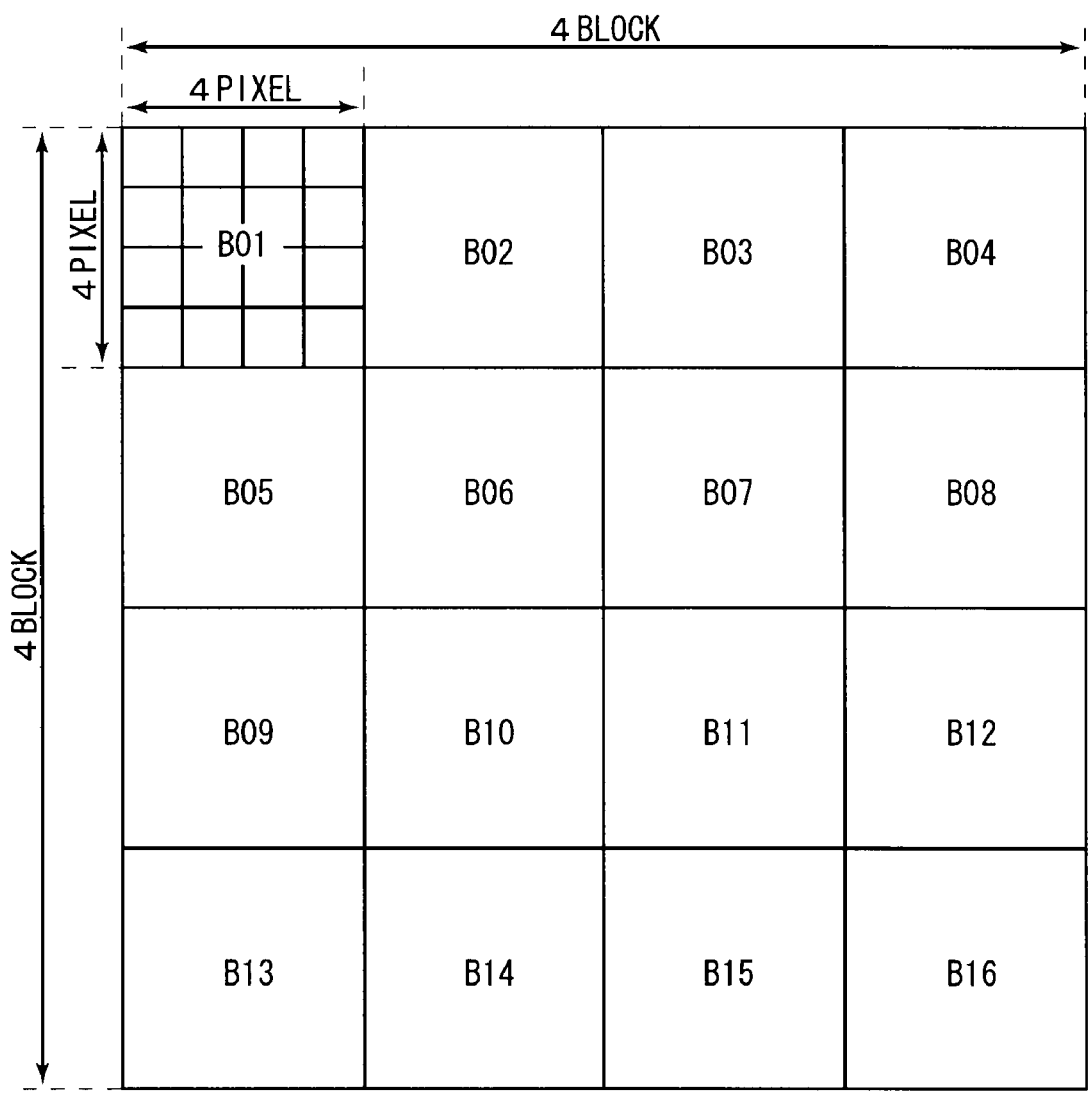
FIG. 2 is a view showing a structure of a macroblock.

The image compression apparatus 10 performs compression on an image on a macroblock-by-macroblock basis. FIG. 2 is a view showing a structure of a macroblock. As shown in FIG. 2, one block consists of 4×4 pixels (16 pixels). One macroblock consists of 4×4 blocks (16 blocks). In other words, one macroblock consists of 16×16 pixels (256 pixels). In FIG. 2, the blocks constituting the macroblock are represented by B01, B02 . . . B16, from the upper left toward right side.

The macroblock having such a structure is present for each of YUV channels, and the macroblock for each of YUV channels is processed in the image compression apparatus 10. The operations discussed below are common to all the color channels.

The first frequency converter 11 performs frequency conversion of the first hierarchy on the still image data inputted to the image compression apparatus 10, to output DC (direct current) component data of the first hierarchy DA01 to DA16 and AC (alternating current) component data of the first hierarchy HP01 to HP16. The AC component data of the first hierarchy HP01 to HP16 correspond to a "High Pass (HP)" component in the HD Photo format. Hereinafter, the AC component data of the first hierarchy is referred to as "high-pass component data HP01 to HP16".

Figures 3, 4:
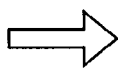
FIG. 3 is a conceptual view showing frequency conversion of the first hierarchy.
FIG. 4 is a conceptual view showing frequency conversion of the second hierarchy.

FIG. 3 is a conceptual view showing the DC component data of the first hierarchy DA01 to DA16 and the high-pass component data HP01 to HP16. As shown in FIG. 3, the DC component data of the first hierarchy DA01 to DA16 and the high-pass component data HP01 to HP16 are generated on a block-by-block basis. The high-pass component data HP01 to HP16 correspond to the blocks B01 to B16, respectively. The DC component data of the first hierarchy DA01 to DA16 each have one piece of conversion factor data. The high-pass component data HP01 to HP16 each have fifteen pieces of conversion factor data.

The second frequency converter 12 performs frequency conversion on the DC component data of the first hierarchy DA01 to DA16 outputted from the first frequency converter 11, to output DC component data of the second hierarchy DB and AC component data of the second hierarchy LP. The DC component data of the second hierarchy DB corresponds to a DC component in the HD Photo format. The AC component data of the second hierarchy LP corresponds to a "Low Pass (LP)" component in the HD Photo format. Hereinafter, the DC component data of the second hierarchy DB is referred to simply as "DC component data DB" and the AC component data of the second hierarchy LP is referred to as "low-pass component data LP".

FIG. 4 is a view showing a change of data due to the frequency conversion of the second hierarchy. By the frequency conversion of the second hierarchy, the DC component data DB and the low-pass component data LP are generated. The DC component data DB has one piece of conversion factor data and the low-pass component data LP has fifteen pieces of conversion factor data.

Thus, the frequency conversion of the first hierarchy is performed on the still image data and the frequency conversion of the second hierarchy is further performed on the DC component data of the first hierarchy DA01 to DA16. Thus, the image compression apparatus 10 performs frequency conversion hierarchically on the still image data on a macroblock-by-macroblock basis, to generate the DC component data DB, the low-pass component data LP and the high-pass component data HP01 to HP16.

The low-pass component data LP and the high-pass component data HP01 to HP16 which are thus generated each have fifteen pieces of conversion factor data. Specifically, the low-pass component data LP has a block consisting of fifteen pieces of conversion factor data for each of three channels of YUV. The high-pass component data HP01 to HP16 each have sixteen blocks each consisting of fifteen pieces of conversion factor data and each of the sixteen blocks has conversion factor data for each of three channels of YUV. On the other hand, the DC component data DB has one piece of conversion factor data for each of three channels of YUV.

The quantization part 13 performs quantization on the DC component data DB, the low-pass component data LP and the high-pass component data HP01 to HP16, to generate the quantization data. The predictive processing part 14 performs predictive coding on the quantization data. The predictive coded quantization data is inputted to the symbol generation part 15.

The symbol generation part 15 generates a symbol string from a bit string of predictive coded quantization data. An operation of the symbol generation part 15 is a characteristic feature of the present invention and detailed description on the operation will be made later. The symbol generation part 15 outputs the generated symbol string to the entropy coding part 16.

The entropy coding part 16 performs entropy coding on the symbolized quantization data, to generate the compressed image data. The compressed image data is outputted as a bit stream on a macroblock-by-macroblock basis.

<2. Data Structure of Symbol>

Next, discussion will be made on a data structure of the symbol data generated in the symbol generation part 15. FIG. 5 is a view showing a data structure of the symbol data. The symbol data in the HD Photo format consists of an absolute value (ABS), an index (INDEX), a sign (SIGN), a zero run (ZERO_RUN) and a flex bit length (FLEXBIT).

The absolute value (ABS) is set by subtracting "1" from the absolute value of a non-zero coefficient. To the sign (SIGN), "0" is set if the sign of the non-zero coefficient is positive and "1" is set if the sign of the non-zero coefficient is negative. To the zero run (ZERO_RUN), the number of sequential zero coefficients present before the non-zero coefficient in the block is set. To the flex bit length (FLEXBIT), the width of bits which are allocated to a flex bit, out of the lower order bits of the quantization data.

The index (INDEX) includes FIRST_INDEX and NEXT_INDEX. The FIRST_INDEX is an INDEX set for the first non-zero coefficient in the block and the NEXT_INDEX is an INDEX set for all the non-zero coefficients except the first non-zero coefficient.

To the least significant bit [0] of the FIRST_INDEX, set is whether there is a zero run before the first non-zero coefficient or not. If there is a zero run, "0" is set and if there is not any, "1" is set.

To the first bit [1] of the FIRST_INDEX, set is whether the absolute value of the corresponding non-zero coefficient is "1" or not. If the absolute value is "1", "0" is set and if the absolute value is not "1", "1" is set.

To the second and third bits [3:2] of the FIRST_INDEX, set is information on the quantization data following the corresponding non-zero coefficient. If all the quantization data following the corresponding non-zero coefficient are zero coefficients, "00" indicating EOB (End Of Block) is set. If the quantization data immediately after the corresponding non-zero coefficient is a non-zero coefficient, "01" is set and if the quantization data immediately after the corresponding non-zero coefficient is a zero coefficient, "10" is set.

To the least significant bit [0] of the NEXT_INDEX, set is whether the absolute value of the corresponding non-zero coefficient is "1" or not. If the absolute value is "1", "0" is set and if the absolute value is not "1", "1" is set.

To the first and second bits [2:1] of the NEXT_INDEX, set is information on the quantization data following the corresponding non-zero coefficient. If all the quantization data following the corresponding non-zero coefficient are zero coefficients, "00" indicating EOB is set. If the quantization data immediately after the corresponding non-zero coefficient is a non-zero coefficient, "01" is set and if the quantization data immediately after the corresponding non-zero coefficient is a zero coefficient, "10" is set.

<3. Types of Registers Included in Symbol Generation Part>

As shown in FIG. 1, the symbol generation part 15 comprises a first register 51, a second register 52, a third register 53, a fourth register 54, a fifth register 55 and a sixth register 56.

The first register 51 is a zero count register for counting the number of sequential zeros. Since the number of quantization data in one block is fifteen, the first register 51 has a storage capacity of 4 bits.

The second register 52 is a zero run register for storing the zero run to be outputted as the symbol data. The second register 52 also has a storage capacity of 4 bits.

The third register 53 is an ABS register for storing an absolute value of the non-zero coefficient to be outputted as the symbol data. In the preferred embodiment, it is assumed that the data width of the quantization data is 32 bits. Therefore, the third register 53 has a storage capacity of 32 bits. In the third register 53, however, the absolute value of the non-zero coefficient is stored itself. When outputted as the symbol data, a value obtained by subtracting "1" from the absolute value is outputted.

The fourth register 54 is a SIGN register for storing the sign of the non-zero coefficient to be outputted as the symbol data. Since information of "0" or "1" is recorded as to the sign as discussed above, the fourth register 54 has a storage capacity of 1 bit.

The fifth register 55 is a first flag register for setting a first flag. To the fifth register 55, "1" is set until the first non-zero coefficient presents itself in the block and "0" is set after the non-zero coefficient present itself. The fifth register 55 has a storage capacity of 1 bit.

The sixth register 56 is a POS register for setting position data. The position data indicates where the current object quantization data is positioned in the block. The position data can be determined from information stored immediately before the input of the non-zero coefficient and zero count information.

<4. Symbol Generation>

Now, discussion will be made on an operation flow of the symbol generation part 15 having the above constitution for generating the symbol data.

Figure 6:
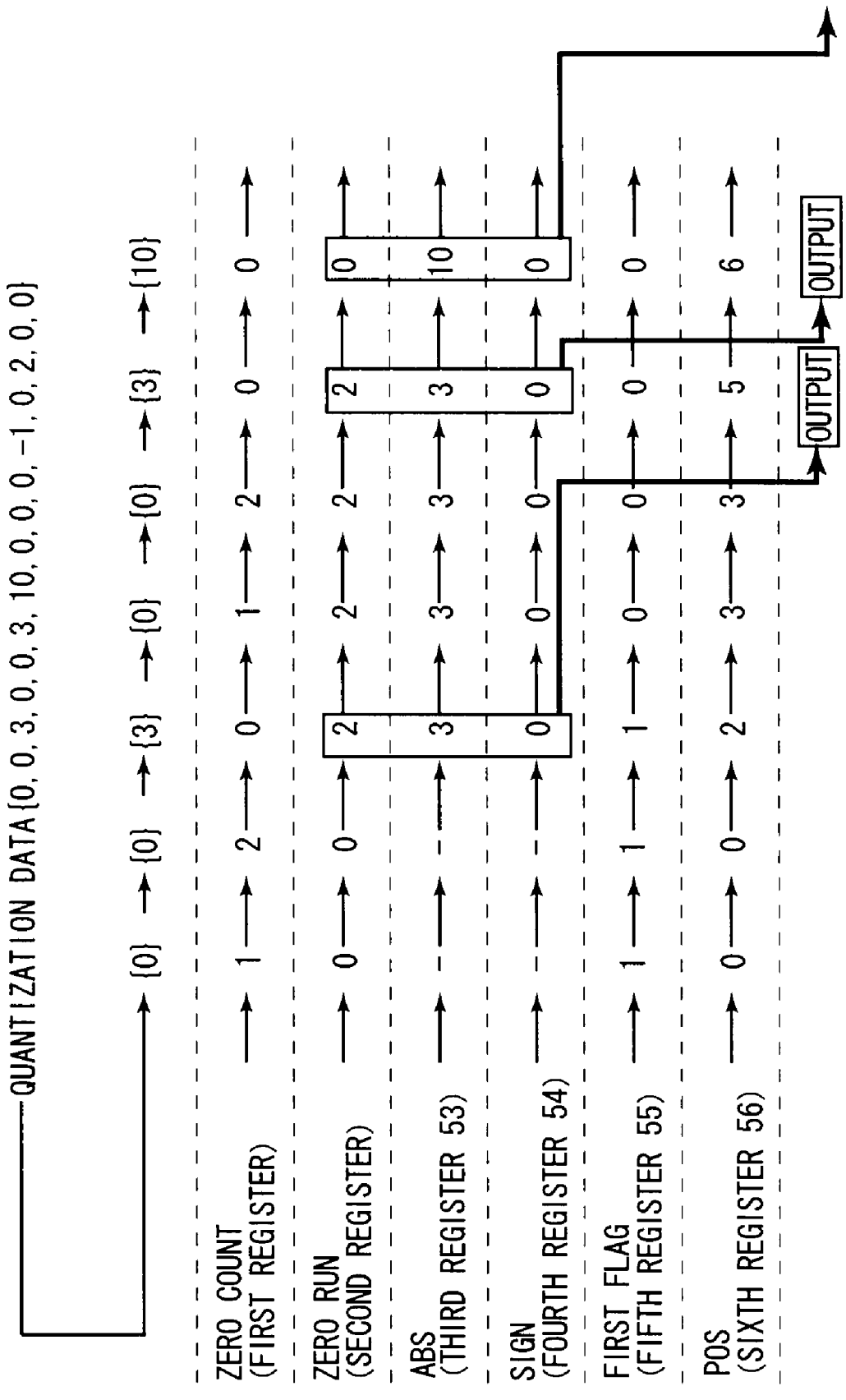
FIG. 6 is a transition diagram of data to be stored in registers in a symbol generation part.

FIG. 6 shows values to be set in those registers in the symbol generation part 15 when a data string {0, 0, 3, 0, 0, 3, 10, 0, 0, 0, −1, 0, 2, 0, 0} is inputted as the quantization data. The symbol generation part 15 serially inputs the data string of quantization data from the head.

First, the symbol generation part 15 inputs the zeroth data {0} thereto. At this timing, the zero count is incremented by one and "1" is set to the zero count register (the first register 51). Further, since {0} is a zero coefficient, the ABS register (the third register 53) and the SIGN register (the fourth register 54) are not determined. To the zero run register (the second register 52) and the POS register (the sixth register 56), "0" is set. To the first flag register (the fifth register 55), "1" is set as an initial value.

When the next first data {0} is inputted, the zero count register (the first register 51) is incremented by one and "2" is set thereto. In the other registers, no data is updated.

Subsequently, when the second data {3} is inputted, since {3} is a non-zero coefficient, "3" is set to the ABS register (the third register 53) and "0" indicating positive is set to the SIGN register (the fourth register 54). Further, to the zero run register (the second register 52), the zero count number of "2" stored in the zero count register (the first register 51) immediately before this input is set, and the zero count register (the first register 51) is initialized to zero. Since the non-zero coefficient presents itself, "2" is set to the POS register (the sixth register 56).

Thus, when the first non-zero coefficient is inputted to the symbol generation part 15 as the second data, the information on the second data, such as ABS, SIGN, ZERO_RUN and the like, are stored in the registers. At this point of time, the second data is not outputted as the symbol data but is stored into the register.

The third and fourth data are "0". Therefore, no data in the second, third, fourth and sixth registers is updated. The zero count register (the first register 51) is incremented to one, then two. The data in the first flag register (the fifth register 55) is fixed to "0" after the first non-zero coefficient presents itself.

While the symbol generation part 15 inputs the third an fourth data, the second, third and fourth registers 52, 53 and 54 hold information on the ABS, the SIGN and the ZERO_RUN of the second data, respectively.

When the fifth data {3} is inputted, since {3} is a non-zero coefficient, "3" is set in the ABS register (the third register 53)

and "0" indicating positive is set to the SIGN register (the fourth register 54). Further, to the zero run register (the second register 52), the zero count number of "2" stored in the zero count register (the first register 51) immediately before this input is set, and the zero count register (the first register 51) is initialized to zero. Since the non-zero coefficient presents itself, "5" is set to the POS register (the sixth register 56).

Thus, when the fifth data {3} is inputted to the symbol generation part 15, the contents in the second, third and fourth registers 52, 53 and 54 are updated. Therefore, before the contents in the second, third and fourth registers 52, 53 and 54 are updated with the fifth data, the data stored in the second, third and fourth registers 52, 53 and 54 are outputted as the symbol data of the second data. Specifically, at the point of time when a new non-zero coefficient presents itself, the symbol data of the immediately preceding non-zero coefficient stored in these registers are outputted and information on the new non-zero coefficient are held in these registers. As to the ABS, however, a value obtained by subtracting "1" from the data value is used as the symbol data.

FIG. 7 is a view showing the contents of the symbol data outputted from the symbol generation part 15. FIG. 7 shows a case where the data string {0, 0, 3, 0, 0, 3, 10, 0, 0, 0, −1, 0, 2, 0, 0} shown in FIG. 6 is inputted as block No. 40.

In FIG. 7, the information of the quantization data inputted to the symbol generation part 15 are shown in the rows above the double line and the contents of the symbol data outputted from the symbol generation part 15 are shown in the rows below the double line.

As shown in FIG. 7, at the timing of inputting the fifth data {3}, the symbol data of the second data {3} is outputted. In other words, the ABS of "2", the FIRST_INDEX of "1010", the ZERO_RUN of "2" and the SIGN of "0" are outputted as the symbol data. The FIRST_INDEX is generated by the symbol generation part 15 at the timing of inputting the fifth quantization data.

The symbol data outputted at the timing of inputting the second quantization data in block No. 40 is the symbol data corresponding to the last non-zero coefficient in the block No. 39.

Referring back to FIG. 6, when the sixth data {10} is inputted, since {10} is a non-zero coefficient, "10" is set in the ABS register (the third register 53) and "0" indicating positive is set to the SIGN register (the fourth register 54). Further, to the zero run register (the second register 52), the zero count number of "0" stored in the zero count register (the first register 51) immediately before this input is set, and the zero count register (the first register 51) is initialized to zero. Since the non-zero coefficient presents itself, "6" is set to the POS register (the sixth register 56).

Thus, when the sixth data is inputted to the symbol generation part 15, the contents in the second, third and fourth registers 52, 53 and 54 are updated. Therefore, before the contents in the second, third and fourth registers 52, 53 and 54 are updated with the sixth data, the data stored in the second, third and fourth registers 52, 53 and 54 are outputted as the symbol data of the fifth data. As to the ABS, however, a value obtained by subtracting "1" from the data value is used as the symbol data.

Referring back to FIG. 7, at the timing of inputting the sixth data {10}, the symbol data of the fifth data {3} is outputted. In other words, the ABS of "2", the NEXT_INDEX of "011", the ZERO_RUN of "2" and the SIGN of "0" are outputted as the symbol data. The NEXT_INDEX is generated by the symbol generation part 15 at the timing of inputting the sixth quantization data.

Thus, the symbol generation part 15 of this preferred embodiment comprises the registers each for storing the information of single quantization data and is capable of generating and outputting symbol data in conformity with the HD Photo.

Figure 9:
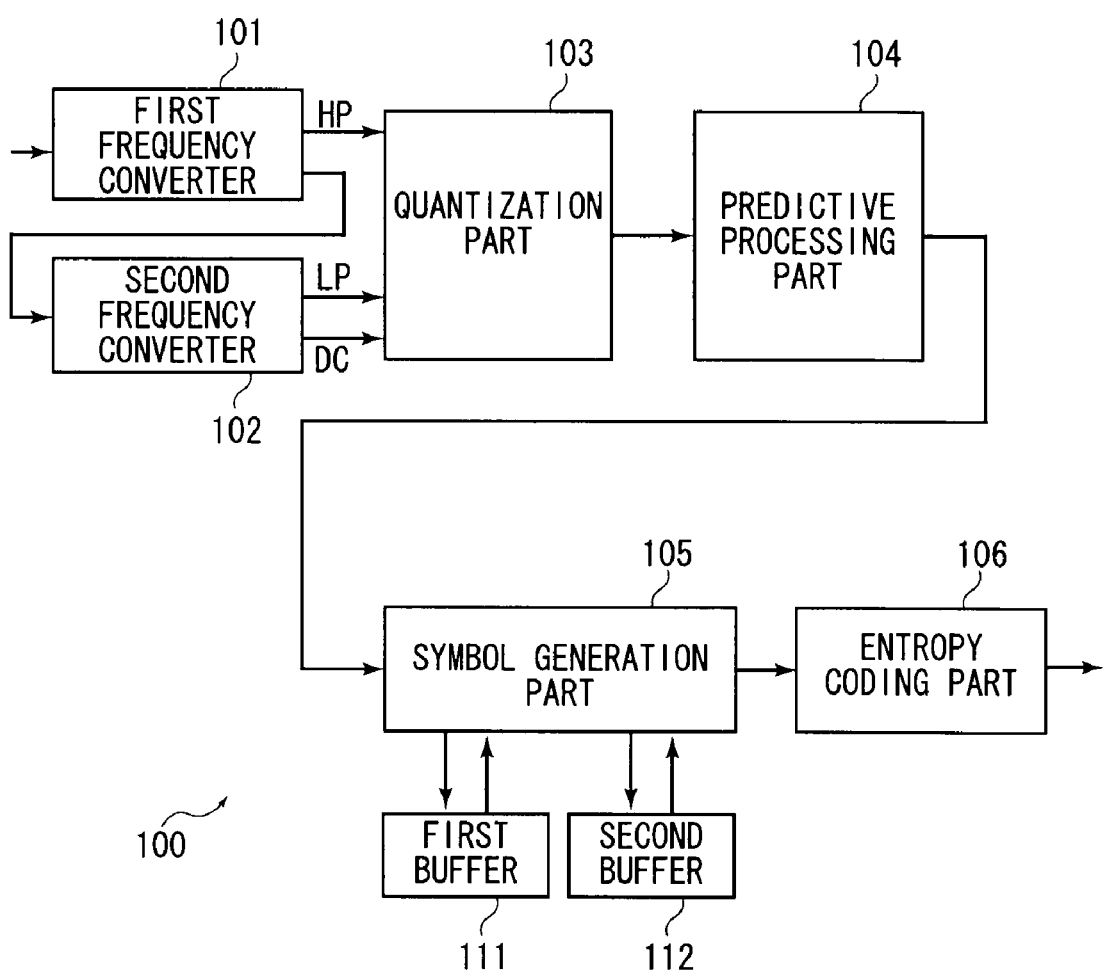
FIG. 9 is a block diagram showing an image compression apparatus in the background art.
Figure 10:
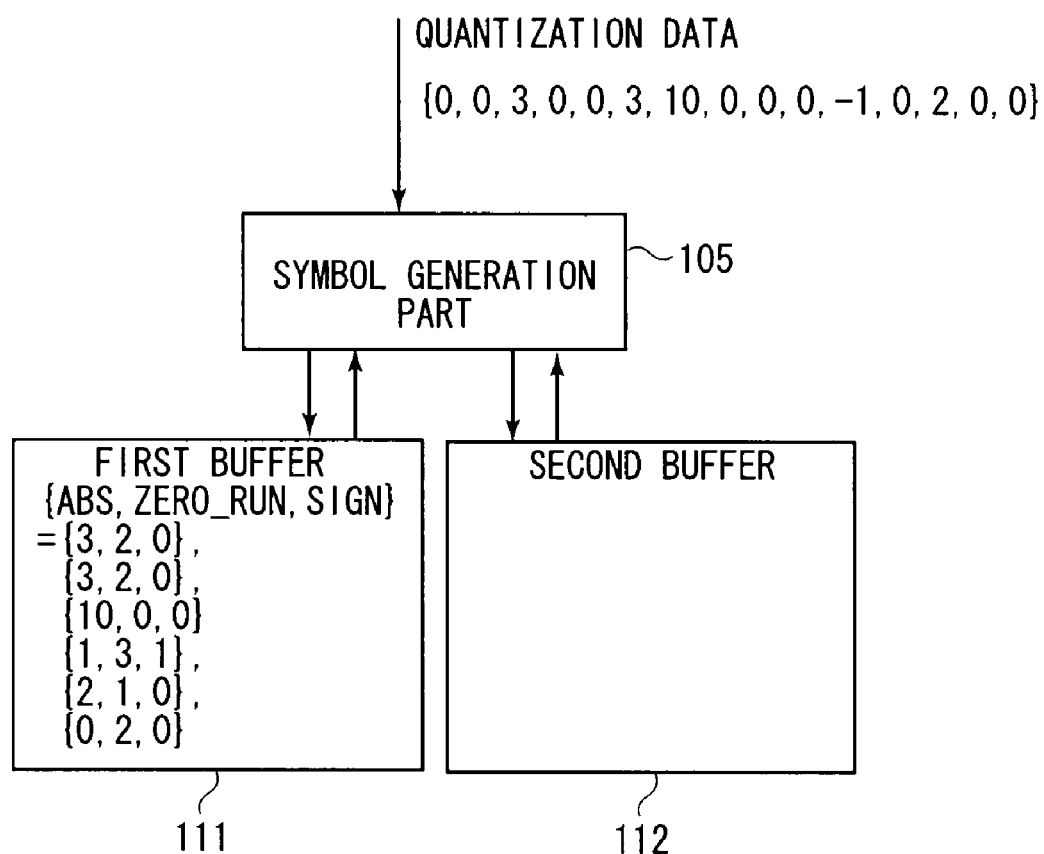
FIG. 10 is a view showing a data format of quantization data stored in buffers in the background-art image compression apparatus.

In the image compression apparatus of FIG. 9 in the background art, the information on all the non-zero coefficients need to be once stored in the buffers. Moreover, in order to increase the processing speed, two buffers having the above function are needed. On the other hand, since the symbol generation part 15 of this preferred embodiment has a constitution for holding the information on only one non-zero coefficient in the block, it is possible to significantly reduce the capacity of the memory devices used in the symbol generation part 15.

In the above preferred embodiment, for example, as to the storage capacity needed for those registers, the first register 51 needs 4 bits, the second register 52 needs 4 bits, the third register 53 needs 32 bits, the fourth register 54 needs 1 bit, the fifth register 55 needs 1 bit and the sixth register 56 needs 4 bits. In short, a storage capacity of only 46 bits is needed in total. Since the two buffers need a size of (32+4+1)×15×2 bits in the constitution of the above-discussed background art, significant reduction in memory size can be achieved.

Further, in the operation of the symbol generation part 15 of this preferred embodiment, unlike in the case of the background-art constitution, there occurs no idle time at the timing of switching from the DC component data to the low-pass component data or the timing of switching from the high-pass component data to the DC component data. Therefore, it is possible to increase the speed of generation of the symbol data.

Furthermore, in the method of this preferred embodiment, it is not necessary to separate the operations for the DC component data, the low-pass component data and the high-pass component data. The rule in which the information of the non-zero coefficient is once stored in the registers and the symbol data is outputted on the basis of the information of the immediately preceding non-zero coefficient held therein when the next non-zero coefficient presents itself can be applied commonly to all the component data.

The symbol data on the last non-zero coefficient in the N-th block is generally outputted at the point of time when the first non-zero coefficient in the (N+1)th block presents itself.

FIG. 8 is a view showing exemplary symbol data outputted at the timing of switching among the high-pass component data, the DC component data and the low-pass component data. The symbol data on the last non-zero coefficient {40} in the block (block No. 53) of the DC component data is outputted at the point of time when the first non-zero coefficient in the first block (block No. 54) of the low-pass component data presents itself. Further, as to the DC component data, only the ABS and the SIGN are outputted as the symbol data, and the absolute value of the quantization data is set itself (without subtraction of "1") as the ABS.

Further, the symbol data on the last non-zero coefficient {1} in the last block (block No. 52) of the high-pass component data is outputted at the point of time when the first non-zero coefficient of the DC component data presents itself.

The symbol data on the last non-zero coefficient in the last block of the low-pass component data is outputted at the point of time when the first non-zero coefficient in the first block of the high-pass component data presents itself.

Thus, since the operations for the DC component data, the low-pass component data and the high-pass component data can be made common, it is possible to commonly use most of the processing circuits. Alternatively, if the processing is implemented by software, it is possible to commonly use most of the algorithms.

While the invention has been shown and described in detail, the foregoing description is in all aspects illustrative and not restrictive. It is therefore understood that numerous modifications and variations can be devised without departing from the scope of the invention.

What is claimed is:

1. An image compression apparatus comprising:
   a frequency converter for performing frequency conversion on image data to generate frequency conversion data;
   a quantization part for performing quantization on said frequency conversion data to generate quantization data;
   a symbol generation part for symbolizing said quantization data to generate symbol data; and
   a coding part for coding said symbol data to generate coded data,
   wherein said symbol generation part has
   a quantization data input part for serially inputting a data string of quantization data consisting of a plurality of blocks;
   a quantization data information memory part capable of storing an absolute value, a sign and zero run information of one piece of quantization data of non-zero coefficient; and
   a symbol data output part for outputting an absolute value, a sign and zero run information of quantization data of the immediately preceding non-zero coefficient stored in said quantization data information memory part as said symbol data if the object quantization data which is inputted to said quantization data input part is a non-zero coefficient.

2. An image compression apparatus according to claim 1, wherein
   said quantization data information memory part includes
   a first memory part whose memory content is updated with the number of sequential zero coefficients inputted immediately before the inputted non-zero coefficient if the object quantization data which is inputted to said quantization data input part is a non-zero coefficient;
   a second memory part whose memory content is updated with said absolute value of the inputted non-zero coefficient if the object quantization data which is inputted to said quantization data input part is a non-zero coefficient; and
   a third memory part whose memory content is updated with said sign of the inputted non-zero coefficient if the object quantization data which is inputted to said quantization data input part is a non-zero coefficient, and
   said symbol data output part outputs the memory contents in said first, second and third memory parts before update as said symbol data of the immediately preceding non-zero coefficient if the object quantization data which is inputted to said quantization data input part is a non-zero coefficient.

3. An image compression apparatus according to claim 2, wherein
   said first memory part includes
   a 1-1st memory part for updating the count number of sequential zero coefficients in a block by increment if the object quantization data which is inputted to said quantization data input part is a non-zero coefficient; and
   a 1-2nd memory part whose memory content is updated with said count number of zero coefficients stored in said 1-1st memory part if the object quantization data which is inputted to said quantization data input part is a non-zero coefficient.

4. An image compression apparatus according to claim 2, wherein
   said symbol generation part further has
   an index generation part for generating index data on said quantization data of the immediately preceding non-zero coefficient if the object quantization data which is inputted to said quantization data input part is a non-zero coefficient,
   said symbol data output part includes
   an index output part for outputting said index data together with said memory contents of said first, second and third memory parts before update, and
   said index data includes
   absolute value information indicating a relation between said absolute value stored in said second memory part before update and "1"; and
   follower information indicating whether the next quantization data in the same block is a zero coefficient or a non-zero coefficient or all the following quantization data in the same block are zero coefficients.

5. An image compression apparatus according to claim 1, wherein
   said frequency converter has
   a first frequency converter for performing frequency conversion on inputted image data, to output a first DC component and a first AC component; and
   a second frequency converter for inputting said first DC component and performing frequency conversion on said first DC component, to output a second DC component and a second AC component,
   said data string of quantization data is a data string in which a block corresponding to said second DC component, a plurality of blocks corresponding to said second AC component and a plurality of blocks corresponding said first AC component each constitute one macroblock in this order and macroblocks formed in this order present themselves repeatedly, and
   symbol data corresponding to quantization data of the last non-zero coefficient in each block is outputted when quantization data of the first non-zero coefficient in the next block presents itself.

* * * * *